United States Patent [19]
Kajimura

[11] Patent Number: 5,294,804
[45] Date of Patent: Mar. 15, 1994

[54] CANTILEVER DISPLACEMENT DETECTION APPARATUS

[75] Inventor: Hiroshi Kajimura, Tokyo, Japan
[73] Assignee: Olympus Optical Co., Ltd., Tokyo, Japan
[21] Appl. No.: 26,989
[22] Filed: Mar. 5, 1993
[30] Foreign Application Priority Data Mar. 11, 1992 [JP] Japan .................... 4-52615

[51] Int. Cl.⁵ ................................. G01N 21/86
[52] U.S. Cl. ........................... 250/561; 250/306
[58] Field of Search ............... 250/561, 306, 307; 356/1, 4

[56] References Cited

U.S. PATENT DOCUMENTS

| | | | |
|---|---|---|---|
| Re. 33,387 | 10/1990 | Binnig | 250/306 |
| 4,914,293 | 4/1990 | Hayashi et al. | 250/306 |
| 5,107,114 | 4/1992 | Nishioka et al. | 250/306 |
| 5,144,128 | 9/1992 | Hasegawa et al. | 250/306 |
| 5,157,251 | 10/1992 | Albrecht et al. | 250/216 |
| 5,164,791 | 11/1992 | Kubo et al. | 356/356 |
| 5,237,859 | 8/1993 | Elings et al. | 250/306 |

FOREIGN PATENT DOCUMENTS 2-281103  11/1990  Japan .

Primary Examiner—David C. Nelms
Assistant Examiner—T. Davenport
Attorney, Agent, or Firm—Frishauf, Holtz, Goodman & Woodward

[57] ABSTRACT

A cantilever displacement detection apparatus comprises a laser diode for emitting a laser beam functioning as detection beam for displacement detection based on an optical lever method, and a position sensor having two light receiving regions for outputting signals corresponding to the intensity of received light. The laser diode and the position sensor are arranged such that the light beam is passed through an objective lens and made incident slantingly on a mirror provided on a free-end portion of a cantilever and the laser beam reflected by the mirror is passed through the objective lens and made incident on the position sensor.

10 Claims, 3 Drawing Sheets

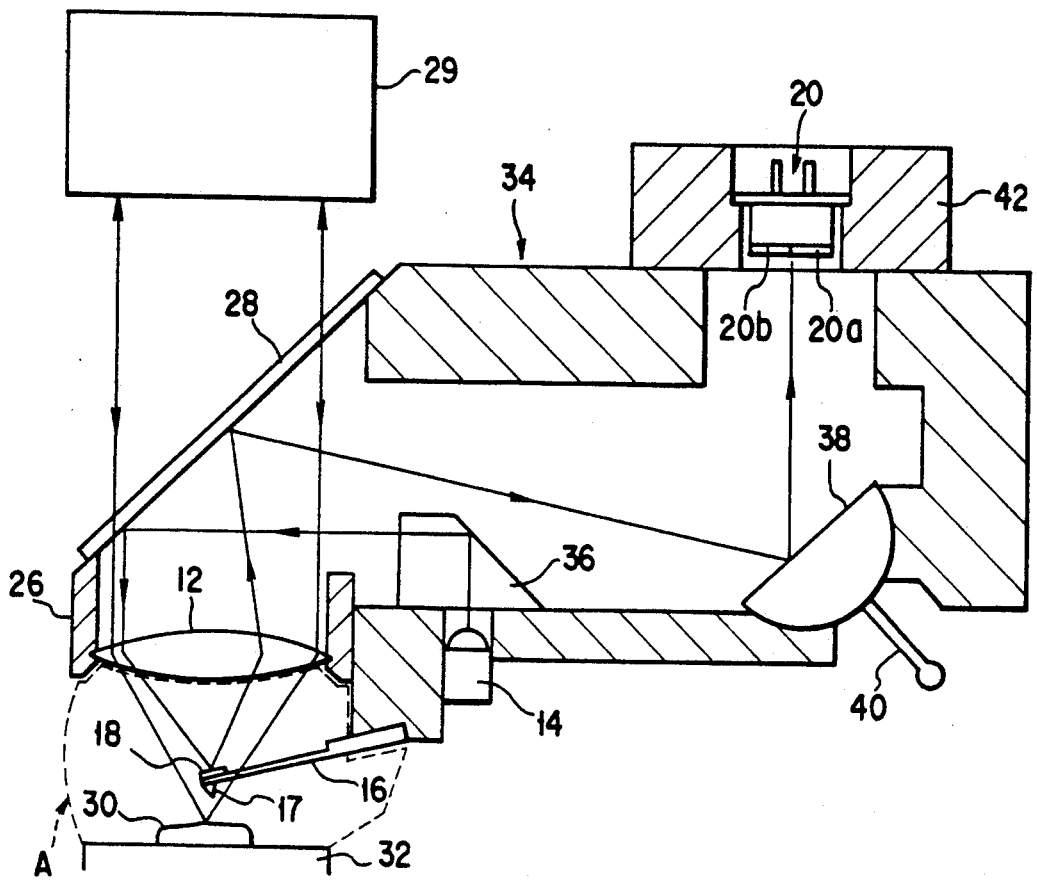
F I G. 2A
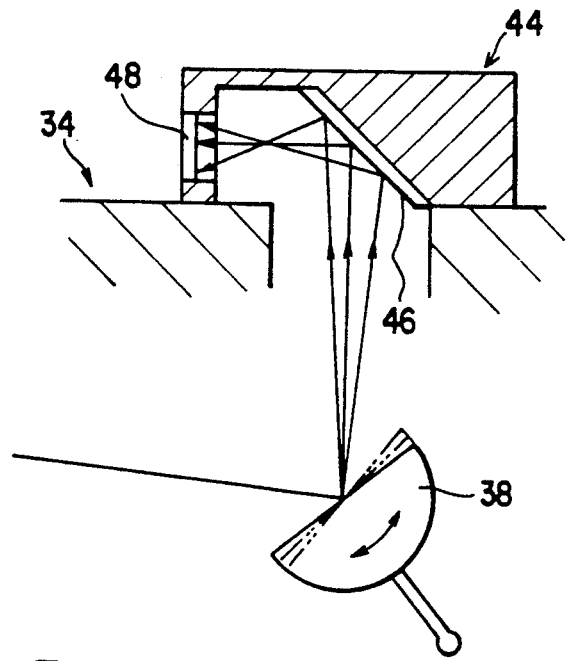
F I G. 2B

CANTILEVER DISPLACEMENT DETECTION APPARATUS

BACKGROUND OF THE INVENTION

1. Field of the Invention

The present invention relates to a cantilever displacement detection apparatus for detecting a displacement of a cantilever in an atomic force microscope (AFM) or the like.

2. Description of the Related Art

A cantilever displacement detection system of an atomic force microscope employs, for example, an interference method or an optical lever method. According to the interference method, a laser beam is radiated on a mirror provided on that surface of a free end portion of a cantilever, which is opposite to the surface thereof provided with a probe, and a variation in intensity of reflected beam due to a displacement of the cantilever is detected by an interferometer. On the other hand, according to the optical lever method, a variation in incidence angle of a laser beam incident on a mirror, which results from a displacement of a cantilever, is detected as an increased displacement of a beam incident on the surface of a beam receiver on the basis of the principle of optical lever.

FIG. 4 shows a conventional cantilever displacement detection apparatus employing the optical lever method. A cantilever 112 supported on a box-shaped frame 110 has a probe 114 at its free end portion. A mirror 116 is provided on that surface of the cantilever which is opposite to the surface thereof provided with the probe 114. A sample 118 is mounted on a sample table 120, such that the sample 118 faces the probe 114 at a short distance. The sample 118 is moved in an XY-direction, i.e. a direction parallel to the surface of the sample 118. The frame 110 contains a laser diode 122 for emitting a laser beam to the mirror 116, and a two-part light receiver 124 for receiving the beam reflected by the mirror 116. The light receiver 124 has two light receiving regions 124a and 124b, and the receiver 124 is adjusted such that the center of the laser beam reflected by the 116 is located at a boundary between the two light-receiving regions 124a and 124b when the cantilever 112 is in its normal measurement position (a horizontal position in FIG. 4). The light receiving regions 124a and 124b output voltage signals corresponding to the intensity of received light. By finding a difference between the two voltage signals, an inclination of the mirror 116, i.e. a displacement of the cantilever 112, can be measured.

When a sample of a living body is observed, the same observation can be performed with a sample region including the cantilever filled with a liquid, as indicated by broken line B in FIG. 4.

The detection sensitivity S of the optical lever method is expressed by $$S = D/\Delta = 2L/l$$

where D is the displacement of the beam on the light receiving surface of the two-part light receiver 124, l is the length of the cantilever 112 (normally 100 to 200 μm), L is the light path length of the reflected beam (the distance between the mirror 116 and the two-part light receiver 124), and Δ is the displacement of the probe 114

When L=100 mm and l=200 μm, $$S = 200/(200 \times 10^{-3}) = 10^3$$

As has been described above, according to the optical ever method, the displacement detection system with simple structure and high sensitivity can be obtained.

A scanning tunneling microscope (STM) or an atomic force microscope (AFM) has a resolution of 10 nm to 0.1 nm which is much higher than a sub-micron resolution of an optical microscope. By the STM or AFM, a real image of a DNA in a cell structure or a molecular/atomic arrangement can be obtained.

In the early stage of development of STMs and AFMs, a crystal having an orderly atomic arrangement was employed as a sample. Any point of such a sample could be observed by simply approaching the probe to that point. However, a sample such as a cluster having an upper pattern on an orderly atomic arrangement, DNA, or a cell membrane of a living body, cannot be observed by such a method. In many cases, however, the presence of such a sample can be detected by an optical microscope although the structure thereof cannot be resolved. Thus, in order to generally locate the measurement area for the STM or AFM, it is very useful to combine an optical microscope with the STM or AFM.

A technique for combining only a probe with an optical path in an STM was already disclosed in PCT International Publication No. WO89/01603 (U.S. patent application Ser. No. 07/460,076 filed Feb. 5, 1990). A similar technique for an AFM was disclosed in Published Unexamined Japanese Patent Application H2-281103. According to this technique, a displacement of a cantilever is detected by a critical angle focus-state detection method combined integrally with an optical system. However, the sensitivity in this critical angle method is inferior to that in the optical lever method.

Accordingly, it is desirable to apply the optical lever method to the cantilever displacement detection system of the AFM. In the optical lever method, it is desirable, as shown in FIG. 4, that the laser diode and two-part light receiver be situated above the cantilever so that the incidence angle of a laser beam may not increase. If the incidence angle of the laser beam incident on the cantilever increases, the detection sensitivity would deteriorate and the detection error would increase. However, when the cantilever displacement detection optical system based on the optical lever method is applied to the AFM having an observation optical system, it is difficult to obtain a high-quality optical path because of the presence of an objective lens or the like of the observation optical system, that is, it is difficult to arrange the laser diode and two part light receiver so as not to increase the incidence angle of the laser beam.

SUMMARY OF THE INVENTION

The object of the present invention is to provide a high-sensitivity, small-sized cantilever displacement detection system employing an optical lever method, the detection system being applicable to an atomic force microscope comprising a optical microscope with good conditions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A to 1C show schematically basic structures of a cantilever displacement detection apparatus according to the present invention, in which FIG. 1A shows the structure wherein the detection apparatus is applied to an observation optical system of an afocal optical system, FIG. 1B shows the structure wherein the detection apparatus is applied to an observation optical system of a definite-point focal optical system, and FIG. 1C shows the structure wherein the detection apparatus is applied to an observation system of another afocal optical system;

FIGS. 2A and 2B show an embodiment of the cantilever displacement detection apparatus of the invention, in which FIG. 2A is a cross-sectional view showing the structure of the embodiment, and FIG. 2B illustrates the adjustment of the direction of the reflection surface of a rotatable mirror shown in FIG. 2A;

DETAILED DESCRIPTION OF THE PREFERRED EMBODIMENTS

Embodiments of the present invention will now be described with reference to the accompanying drawings.

Figures 1A, 1B, 1C:
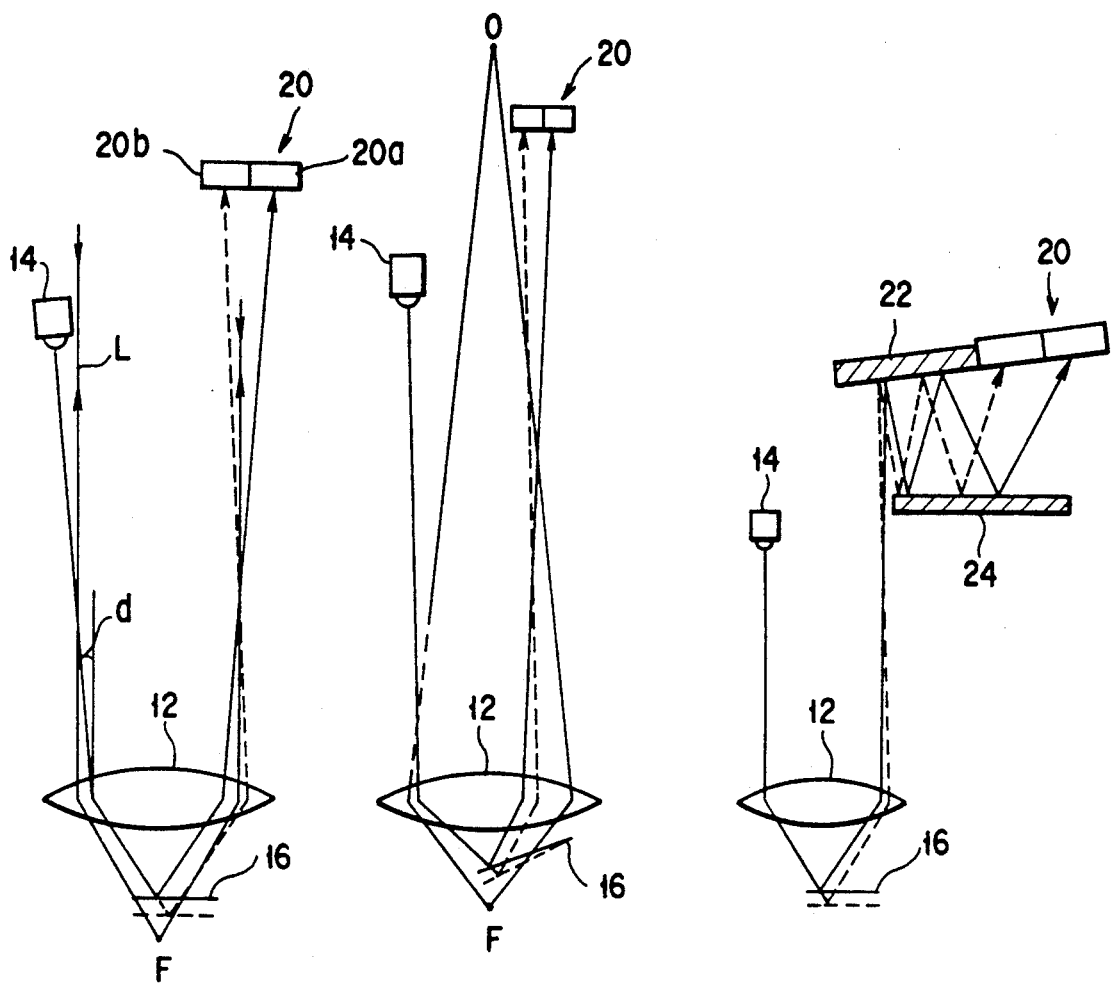

FIG. 1A shows an embodiment of the invention wherein the detection apparatus of the invention is applied to an observation optical system of an afocal optical system. In this optical system, a parallel observation beam L travels through an objective lens 12 and converges at a focal point F. At the time of measurement, the focal point F is located on the surface of a sample. A light beam emanating from the focal point F enters the objective lens 12 and changes to a parallel beam. The parallel beam does not focus in this state. A focused observation image is obtained by focusing the parallel beam by means of a focusing lens (not shown) provided at an upper region in FIG. 1A.

A laser diode 14 is situated such that a detection beam emanating from the laser diode 14 is made incident on the left part of the objective lens 12 at an angle $\alpha(2°-3°)$ to the optical axis. The detection beam is refracted by the objective lens 12 and then reflected by a reflection surface member or mirror 18 provided on the upper part of a free-end portion of a cantilever 16. The detection beam reflected by the mirror 18 of cantilever 16 enters the right part of the objective lens 12, and it is deflected and made incident on a two-part detector 20. The two-part detector 20 has two light receiving regions 20a and 20b. The light receiving regions 20a and 20b output signals corresponding to the intensity of the incidence light. When the cantilever 16 is situated in a position indicated by a solid line, the detection beam is made incident more on the right-hand light receiving region 20a of the two-part detector 20 than on the left-hand light receiving region 20b. By contrast, when the cantilever 16 is situated in a position indicated by a broken line, the detection beam is made incident more on the left-hand light receiving region 20b of the two-part detector 20 than on the right-hand light receiving region 20a. Since the ratio of the detection beam incident on the light receiving regions 20a and 20b varies in accordance with the position of the cantilever 16, the position (displacement) of the cantilever 16 can be detected by finding the difference between the signals output from the light receiving regions 20a and 20b.

In the case of the afocal observation optical system, any part of the parallel observation beam emanating from the focal point F contains optical information on the surface of the sample. Thus, even if part of the observation beam is intercepted by the laser diode 14 and/or two part light receiver 20, there is no problem with image formation, except that an optical observation image of the sample becomes slightly dark.

FIG. 1B shows an embodiment of the invention wherein the detection apparatus of the invention is applied to an observation optical system of a definite-point focal optical system. In this optical system, a cantilever is inclined to the surface of a sample. In the definite-point focal optical system, an observation beam emanating from a focal point F (on the surface of the sample) is focused directly at a point O. Thus, the laser diode 14 and two part light receiver 20 are situated outside so as not to intercept the observation beam.

FIG. 1C shows an embodiment of the invention wherein the detection apparatus of the invention is applied to an observation optical system of an afocal optical system. The laser diode is situated such that a detection beam emitted therefrom is made incident on the objective lens 12 in parallel to the optical axis. Two mirrors 22 and 24 are arranged in a non-parallel fashion midway along the optical path between the objective lens 12 and two-part light receiver 20. The detection beam, once reflected by the cantilever 16, is reflected by the mirror 22 (two times) and mirror 24 (two times). Then, the detection beam is made incident on the two-part light receiver 20. According to this structure, a displacement of the detection beam due to a displacement of the cantilever 16 is amplified while the detection beam is reflected by the mirrors 22 and 24. Therefore, the detection sensitivity is higher than in the case where the two-part light receiver is situated in the optical path without providing the mirrors.

A more specific embodiment of the cantilever displacement detection apparatus of the invention will now be described with reference to FIGS. 2A and 2B. As is shown in FIG. 2A, a half mirror 28 is provided above an objective lens 12 supported by a lens-barrel 26. The half mirror 28 is situated at 45° to the optical axis of the observation optical system. A focusing optical system 29 associated with the objective lens 12 to constitute an observation optical system is provided above the half mirror 28. The observation optical system is of the afocal type, and a parallel observation beam passes through the half mirror 28 and the objective lens 12 and converges on the surface of a sample 30. The observation beam is reflected by the surface of the sample 30 and made incident on the objective lens 12. The observation beam is converted to a parallel beam through the lens 12. The parallel beam travels through the half mirror 28 and is focused in the focusing optical system 29.

The lens-barrel 26 is attached to an optical frame 34 as one body. The optical elements of a displacement detection optical system based on an optical lever method are arranged within the frame 34. A laser diode 14 is provided at a lower part of the frame 34 such that a detection laser beam is emitted upward from the diode 14. The laser diode 14 emits a detection laser beam towards a prism 36 situated above. The beam is deflected to the left by the prism 36. The beam emanating from the prism 36 is reflected by the half mirror 28 onto a left-hand part of the objective lens 12. Then, the beam is deflected by the lens 12 and made incident on a mirror 18 provided on the upper surface (opposite to the surface provided with a probe 17) of a free-end portion of a cantilever 16 attached to the optical frame 34. Since the mirror 18 is inclined 10° with respect to the surface of the sample 30, the laser beam reflected by the mirror 18 enters a substantially middle portion of the objective lens 12. The beam is deflected by the lens 12, reflected by the half mirror 28, and made incident on a rotatable mirror 38 situated at a lower right part (in FIG. 2A) of the frame 34. The rotatable mirror 38 has a spherical side surface which is slidable on the frame 34. The direction of the reflection surface of the mirror 38 can be varied by moving a lever 40. The laser beam reflected by the rotatable mirror 38 is made incident on a two-part light receiver 20 attached to a support member 42. The support member 42 is slidable on the optical frame 34. The two-part light receiver 20 has two light receiving regions 20a and 20b. As has been described above, a displacement of the cantilever 16 can be detected by finding a difference between outputs from the two light receiving regions 20a and 20b.

In AFM measurement, the direction of the reflection surface of the rotatable mirror 38 is adjusted so that the mirror 38 can reflect a laser beam vertically upward when the cantilever 16 is in the normal position. In addition, the position of the two-part light receiver 20 is adjusted in advance so that the laser beam reflected by the rotatable mirror 38 can be made incident on a boundary between the two light receiving regions of the two-part light receiver 20. The adjustment for the rotatable mirror 38 and light receiver 20 will now be described. As is shown in FIG. 2B, a mirror box 44 containing a mirror 46 inclined 45° is slidable mounted on the optical frame 34 (the support member 42 has not yet mounted on the frame 34 at this time). A laser beam emanating from the rotatable mirror 38 is reflected by the mirror 46 and projected onto a frosted glass 48 located at the left-hand part of the mirror box 44. The lever 40 is operated while the frosted glass 48 is being viewed, thereby adjusting the rotatable mirror 38 so that an image of the projected beam may come at the center of the frosted glass 48. When the laser beam is projected at the center of the frosted glass 48, the laser beam reflected by the rotatable mirror 38 travels vertically upwards. Then, the mirror box 44 is removed, and the support member 42 with the two-part light receiver 20 is mounted on the optical box 34, as shown in FIG. 2A. The position of the support member 42 is adjusted so that the outputs from the two light receiving regions 20a and 20b of the light receiver 20 may become equal to each other. When the outputs from the light receiving regions 20a and 20b has become equal to each other, the center of the laser beam coincides with the boundary of the two light receiving regions 20a and 20b. Thus, the adjustment is completed.

In general, the two-part light receiver 20 may be a position sensing device (PSD) for detecting the position of reception of a laser beam.

Figure 4:
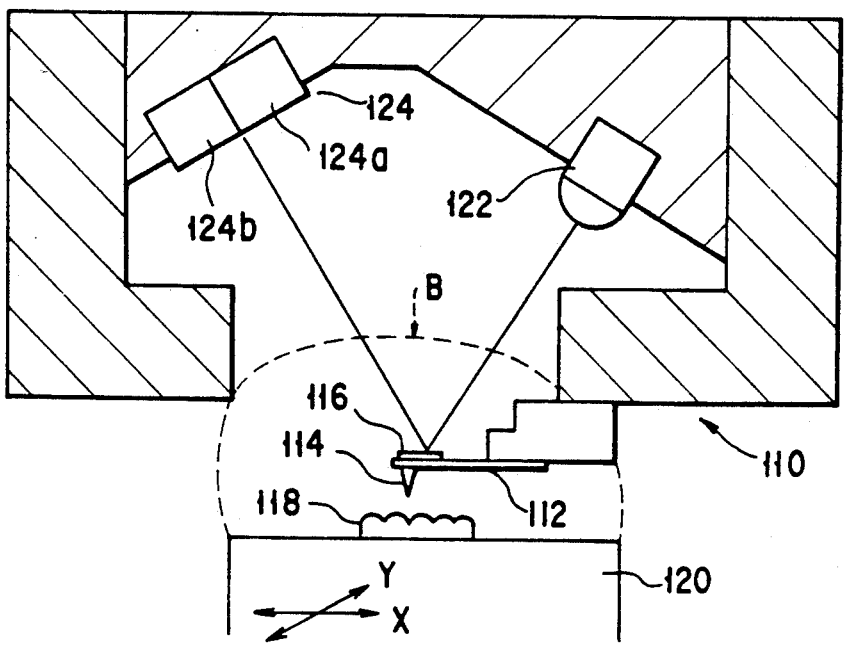
FIG. 4 shows a basic structure of a cantilever displacement detection apparatus employing an optical lever method.

In FIG. 2A, the sample 30 and cantilever 16 may be situated in a liquid, as indicated by broken line A. It is desirable to situate the sample 30 and cantilever 16 in a liquid, in particular, when the sample 30 is a living body. In connection with this, in the prior art shown in FIG. 4, the liquid containing the sample 118 forms a boundary surface, as indicated by broken line B, so as not to wet the laser diode 122 or two-part light receiver 124. This boundary surface may be vibrated by external vibration and, in this case, noise may be produced in the laser beam and the output of the beam becomes unstable. By contrast, in the present embodiment, the area of the boundary surface of the liquid, through which the laser beam passes, is always put in contact with the objective lens 12. Thus, the embodiment of FIG. 2A is effective in a liquid-immersion type AFM.

Figure 3:
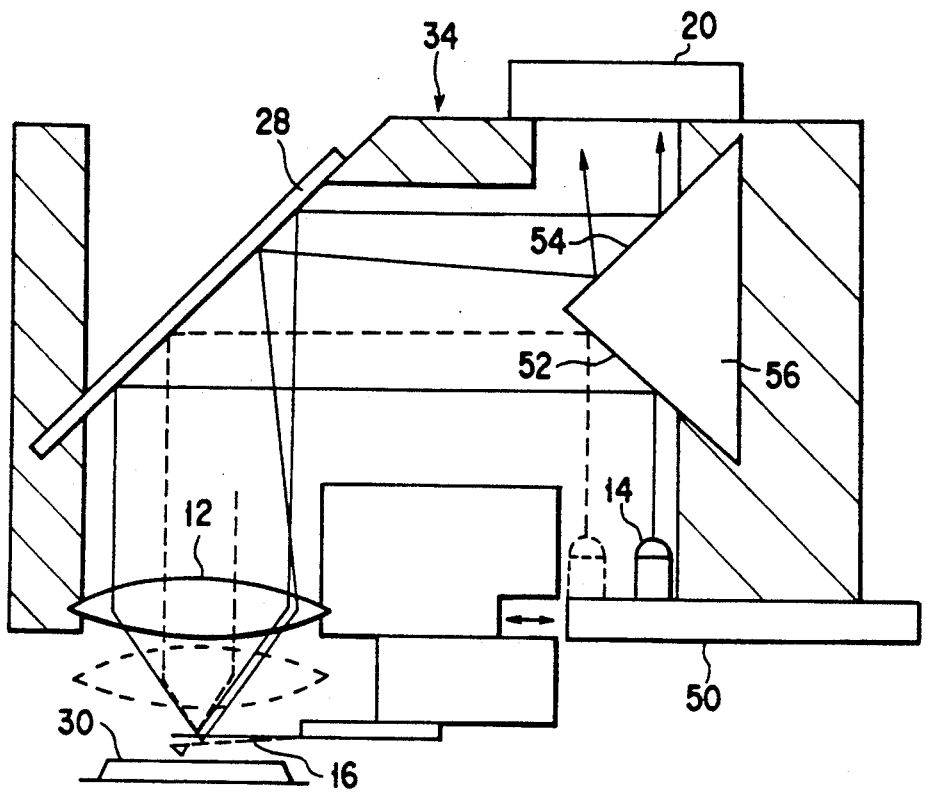
FIG. 3 shows another embodiment of the cantilever displacement detection apparatus of the invention.

FIG. 3 shows another embodiment of the invention. According to this embodiment, a mirror body 56 is provided within the optical frame 34. The mirror body 56 has a reflection surface 52 for horizontally deflecting a laser beam emanating vertically upward from the laser diode 14 and a reflection surface 54 for guiding a return laser beam from the cantilever 16 to the two-part light receiver 20.

When the objective lens 12 is replaced by another objective lens 12 with a different magnification, the position of the lens 12 is varied in accordance with the magnification so that the sample 30 can be observed by the observation optical system including the half mirror 28. For example, when the lens 12 is replaced by an objective lens with a higher magnification, the lens is shifted to a position indicated by a broken line. In addition, when the magnification of the objective lens 12 is varied, the incidence angle of the laser beam incident on the cantilever 16 varies accordingly. In order to adjust the incidence angle of the laser beam at an optimum value, a table 50 supporting the laser diode 14 is provided on the optical frame 34 so as to be horizontally movable. Thus, the position of the laser diode 14 is adjusted in accordance with the magnification of the objective lens 12, so that the laser beam may be made incident on the cantilever 16 at an optimum angle.

As has been described above, the cantilever displacement detection apparatus of the present invention includes the objective lens of the observation optical system as an optical element, and therefore this detection apparatus can easily be applied to an atomic force microscope (AFM) or the like having an observation optical system. Accordingly, this invention can provide an atomic force microscope or the like combined integrally with an optical microscope, which includes a cantilever displacement detection system based on an optical lever method with simple structure and high sensitivity.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A cantilever displacement detection apparatus for detecting a displacement of a cantilever of an atomic force microscope or the like provided with an observation optical system including an image formation optical system and an objective lens, said apparatus comprising:
- a light source for emitting a light beam; and
- a position sensor for detecting a position of reception of the light beam,
- wherein the light source and the position sensor are arranged such that the light beam is passed through the objective lens and made incident obliquely on a reflection surface of a free-end portion of the cantilever and the laser beam reflected by the reflection surface is passed through the objective lens and made incident on the position sensor, thereby detecting the displacement of the cantilever on the basis of the position of reception of the beam on the position sensor.

2. The apparatus according to claim 1, further comprising:
- first deflecting means, provided in an optical path between the light source and the objective lens, for deflecting the light beam; and
- second deflecting means, provided in an optical path between the objective lens and the position sensor, for deflecting the light beam.

3. The apparatus according to claim 2, wherein both said first deflecting means and said second deflecting means include a half mirror situated between the focusing optical system and the objective lens.

4. The apparatus according to claim 3, wherein said half mirror is inclined 45° with respect to the optical axis of the observation optical system.

5. The apparatus according to claim 3, wherein the first deflecting means further includes a reflection optical element for reflecting the light beam from the light source toward the half mirror, so that the light beam reflected by the half mirror is incident on the objective lens in parallel to the optical axis of the observation optical system.

6. The apparatus according to claim 4, wherein the first deflecting means further includes a reflection optical element for reflecting the light beam from the light source so as to make the light beam incident on the surface of the half mirror at an angle of 45° in a plane including a line normal to the surface of the half mirror and the optical axis of the observation optical system.

7. The apparatus according to claim 3, wherein the second deflecting means further includes reflection means having a reflection surface for reflecting the light beam and adjusting means for desirably adjusting the direction of this reflecting surface.

8. The apparatus according to claim 7, wherein said adjusting means has a spherical-segment member, a support member, which is put in surface contact with the spherical surface of the spherical-segment member for slidably supporting the spherical-segment member, and a lever fixed to the spherical-segment member, said adjusting means being provided with the reflection surface at the flat surface of the spherical-segment member.

9. The apparatus according to claim 3, further comprising adjusting means for varying the location on the half mirror on which the light beam is made incident, while keeping constant the angle of incidence at which the light beam emitted from the light source is made incident on half mirror.

10. The apparatus according to claim 9, wherein the adjusting means includes means for moving the light source in a direction perpendicular to the direction of emission of the light beam.

* * * * *